July 22, 1958 G. W. JACKSON 2,844,384
CONTROL APPARATUS FOR FLUID SUSPENSION SYSTEM
Filed June 18, 1956
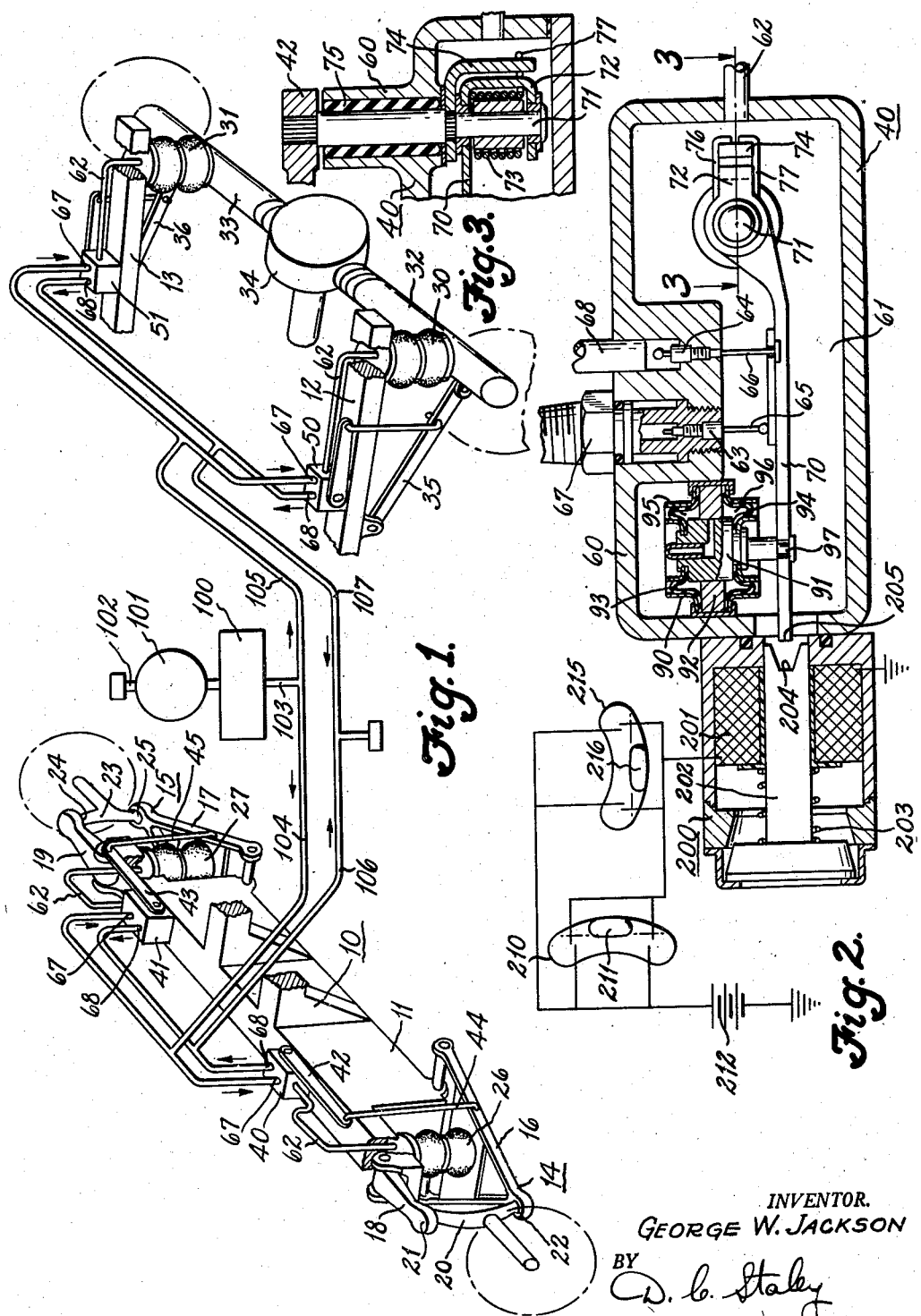
INVENTOR.
GEORGE W. JACKSON
BY
D. C. Staley
ATTORNEY

United States Patent Office 2,844,384
Patented July 22, 1958

2,844,384

CONTROL APPARATUS FOR FLUID SUSPENSION SYSTEM

George W. Jackson, Dayton, Ohio, assignor to General Motors Corporation, Detroit, Mich., a corporation of Delaware Application June 18, 1956, Serial No. 592,065

7 Claims. (Cl. 280—124)

This invention relates to control apparatus to regulate delivery and discharge of fluid to a fluid suspension system for a motor vehicle.

The apparatus of the invention is particularly adapted for use on vehicles having a suspension system in which an expansible fluid spring, such as a bellows type of air spring, provides the resilient means for supporting the body of a vehicle upon the axles, the body of the vehicle representing a sprung mass as distinguished from the wheel and axle assembly that comprises an unsprung mass.

It is desirable that the body of a vehicle be disposed normally with a low and predetermined clearance height relative to the axles of the vehicle to effect a low center of gravity in the vehicle, and to maintain the clearance height between the sprung mass, represented by the body, and the unsprung mass, represented by the wheel assembly, at the predetermined clearance height irrespective of load that is carried within the body of the vehicle. In a suspension system in which an expansible type of air spring is provided between the unsprung mass and the sprung mass of the vehicle, air can be admitted into the air spring to increase the pressure in proportion to the load increase in the vehicle, or exhausted from the air spring to compensate for a lightening of the load. Also, suitable valve controls serving each of the air springs positioned at the front and rear axles are provided for the respective springs to effect an increase in air pressure or exhaust of air independently to provide for leveling of the sprung mass relative to the unsprung mass to maintain the body of the vehicle in a relatively constant horizontal position irrespective of the load variance from one side to the other of the vehicle.

The control valves are preferably of a type in which the valve action for admission and exhaust of air to and from the air springs is damped or impeded so that rapid axle oscillations will not effect an instantaneous delivery of air or exhaust of air to or from the respective air springs, but rather the delivery and exhaust of air to and from the air spring is a function of the average movement of the axle relative to the chassis of the vehicle with the result that if the chassis settles relative to the axles, air will be supplied into the air springs to restore the chassis to its predetermined height clearance relative to the axles, or if the chassis rises relative to the axles air will be exhausted from the air springs to restore the predetermined height clearance.

When a vehicle negotiates a curve, the chassis or body of the vehicle changes its angular attitude relative to the running gear so that the air springs on the outboard side of the curve tend to be compressed while the air springs on the inboard side of the curve tend to expand. Such action would normally operate the control valves to effect a change in fluid pressure within the air springs to increase the air pressure in the outboard springs and decrease the pressure in the inboard springs. As the vehicle comes out of the curve, the control valves again attempt to restore the angular attitude of the car body to a normal horizontal position. However, such action may not be wholly desirable because of certain sway that is created in the body under conditions wherein the damping device for the control valves tends to retard the action of the control valves, thus when a vehicle is coming out of a curve, after having negotiated a long curve, the body of the vehicle will tend to reverse its angular attitude for a short period of time until the delayed action of the control valves can respond to restore the body to a normal horizontal position.

To avoid this situation it is an object of this invention to provide a control that is sensitive to a change in angular attitude of the sprung mass relative to the unsprung mass or to centrifugal force on the sprung mass so as to render the control valves for the air springs ineffective during the period of time the vehicle is negotiating a curve. This arrangement prevents any change of air pressure in the respective springs and tends to effect a better degree of stabilization for the vehicle.

It is another object of the invention to provide a control apparatus for a fluid suspension system of the type hereinbefore described wherein the control valves for supplying fluid to the air spring and exhausting fluid from the air springs have one position to supply the fluid and a second position to exhaust the fluid with a third or neutral position in which neither supply nor exhaust occurs, the control valve also being provided with a control member that is actuated in response to a change in angular attitude of the sprung mass relative to the unsprung mass or in response to the effect of centrifugal force on the spurng mass to retain the control valve in its neutral position so long as the change of angular attitude or condition exists.

Further objects and advantages of the present invention will be apparent from the following description, reference being had to the accompanying drawings wherein a preferred form of the invention is clearly shown.

In the drawings:

Figure 1 is a diagrammatic representation of an air suspension system incorporating features of this invention.

Figure 2 is a cross sectional view of a control for regulating the air springs.

Figure 3 is a cross sectional view taken along line 3—3 of Figure 2.

In this invention the vehicle consists of a sprung mass or chassis 10 having a front cross frame member 11 and longitudinal frame members 12 and 13. Front wheel axle assemblies 14 and 15 are provided at each end of the front cross frame member 11 and consist of lower control arms 16 and 17 and upper control arms 18 and 19 pivotally carried on the cross frame 11. The control arms 16 and 18 are interconnected by a steering knuckle 20 connected with the control arms by spherical joints 21 and 22. Similarly, the control arms 17 and 19 are interconnected by a steering knuckle 23 that connects with the control arms by spherical joints 24 and 25. Fluid springs 26 and 27 are provided between the lower control arms 16 and 17 and opposite ends of the cross frame 11 whereby the chassis frame 10 is the sprung mass supported from the wheel assemblies 14 and 15 by means of the fluid springs 26 and 27.

The fluid springs 26 and 27 are of the bellows type adapted to receive air under pressure to effect resilient suspension of the chassis frame 10 upon the wheel assemblies, and to maintain a predetermined clearance height between the chassis frame and the wheel assemblies when the vehicle is in a static position, and to provide for correction of any change in height relation to reestablish the predetermined clearance height.

Fluid springs 30 and 31 are provided between the rear axle assemblies 32 and 33 and the chassis frame members 12 and 13 whereby to support the rear portion of the chassis frame upon the rear axles 32 and 33, the fluid springs 30 and 31 effecting the same support for the chassis frame and the same height relation as is provided by the front fluid springs 26 and 27.

The rear axle assemblies 32 and 33 may be independently supported from the differential housing 34 to provide for independent vertical movement of the axles, drag links 35 and 36 connecting the axles 32 and 33 with the chassis frame members 12 and 13 to prevent longitudinal movement of the axle assemblies relative to the chassis frame.

Fluid pressure within the front axle positioned springs 26 and 27 is regulated by the fluid control valves 40 and 41 that are supported on the chassis frame 10. The control valves 40 and 41 have actuating arms 42 and 43 respectively that are connected with the lower control arms 16 and 17 of the front wheel assemblies through actuating links 44 and 45. Thus when the chassis frame 10 settles downwardly relatively to the front wheel assemblies, the actuating levers 42 and 43 are moved upwardly to open a fluid control valve within the valves 40 and 41 to allow fluid under pressure to be admitted into the air springs 26 and 27. Reverse upward movement of the chassis frame 10 relative to the front wheel assemblies causes downward movement of the control arms 42 and 43 to open fluid exhaust valves within the controls 40 and 41 to permit exhaust of fluid from the air springs. The foregoing action of the control valves 40 and 41 effects a correction of clearance height between the sprung mass and the unsprung mass of the vehicle to maintain the clearance height relatively constant irrespective of load conditions.

Similarly, control valves 50 and 51 mounted on the chassis frame members 12 and 13 control supply and exhaust of fluid to and from the rear axle positioned fluid springs 30 and 31. The control valves 50 and 51 are identical with the control valves 40 and 41, one of which valves is more particularly illustrated in Figures 2 and 3. The control valve comprises a housing 60 having a chamber 61 from which a fluid supply conduit 62 extends into connection with one of the air springs 26, 27, 30 or 31 from the respective control valves 40, 41, 50 and 51. The housing 60 contains a fluid pressure inlet valve 63 and a fluid pressure outlet valve 64 each of which is similar to a conventional tire valve. The valve 63 is opened upon upward movement of the actuating stem 65 and the valve 64 is opened upon downward movement of the actuating stem 66. The fluid pressure inlet connection 67 carries the valve 63 and the valve 64 exhaust fluid into the conduit connection 68.

The valve elements 63 and 64 are actuated by a lever 70 that is supported upon a shaft 71 for free rotation thereon. The lever 70 has the portion 72 thereof engaged on opposite sides by opposite ends 76 and 77 of a torsion spring 73, which opposite ends of the torsion spring also engage an actuating member 74 that is non-rotatably carried on the shaft 71 that extends exteriorly of the housing 60 through the rubber bearing and seal member 75. The outer end of the shaft 71 carries the actuating lever 42 of the control valve 40, the control valve 40 being taken as merely representative of the several control valves heretofore referred to.

When the actuating lever 42 moves upwardly, that is rotates the shaft 71 clockwise as viewed in Figure 2, the lever 70 opens the valve 63 to allow fluid pressure to enter the chamber 61 and be delivered through the conduit 62 into the air spring connected with the valve. Conversely when the lever 42 moves downwardly, that is rotates the shaft 71 counterclockwise as viewed in Figure 2 the valve 64 is opened to allow exhaust of fluid from the air spring. The shaft 71 can oscillate relative to the actuating lever 70 with overthrow being accepted by the torsion spring ends 76 and 77 without effecting comparable following movement of the lever 70 since the lever 70 is damped in its rotative movement about the shaft 71 by the motion impeding device 90.

The motion impeding device 90 comprises a piston 91 slidable within a guide cylinder 92. Opposite ends of the damping device 90 are closed by rubber diaphragms 93 and 94 forming damping chambers 95 and 96. The damping device 90 is filled with a liquid, or it may be air filled with the fluid displacement between chambers 95 and 96 occurring between the piston 91 and the wall of the cylinder guide 92. The rate of displacement of the fluid between the chambers 95 and 96 is that which controls the rate of movement of the lever 70. Thus rapid axle oscillations of the vehicle axles will not effect instantaneous delivery or exhaust of air to and from the air springs, as would be occasioned if the motion impeding device or damping device 90 were not connected with the lever 70 through the connecting member 97. The construction and operation of the control valve 40 is quite similar to that disclosed in the copending application S. N. 519,598, filed July 1, 1955.

The control valves 40, 41, 50 and 51 just described more particularly with reference to Figures 2 and 3 obtain their fluid under pressure from a reservoir 100 that is supplied with fluid under pressure, preferably air, by means of a compressor 101 that has an inlet conduit 102. Fluid under pressure is delivered from the reservoir 100 into the conduit 103 from which the fluid is delivered into the conduits 104 and 105 for supplying the control valves 40 and 41 and 50 and 51 respectively. The control valves 40 and 41 have their exhaust conduits 68 connected with an exhaust line 106. Similarly, the exhaust conduit 68 of the rear control valves 50 and 51 connect with an exhaust conduit 107.

The air suspension heretofore described functions in a manner that the motion impeding device 90 of the control valves 40, 41, 50 and 51 retards the opening and closing of the inlet and exhaust valves 63 and 64 so that rapid axle oscillations will not effect instantaneous delivery and exhaust of fluid to and from the respectively controlled air springs. But rather, air is supplied or exhausted from the respective air springs only in response to the average position of the axles relative to the chassis frame, which average position represents either an increase or decrease of loading of the body of the vehicle.

However, when a vehicle is in operation over the road, the negotiation of curves causes a change in angular attitude of the chassis of the vehicle relative to the running gear. While the motion impeding device 90 will normally prevent functioning of the control valves 40, 41, 50 and 51 for a sufficient period of time to permit a vehicle to negotiate a short curve, yet on a prolonged curve, the change in angular attitude of the chassis relative to the running gear persists for a sufficient length of time that the motion impeding device 90 allows the arm 70 of the control valves to move. Under this prolonged angular change of attitude condition, the control valves on the inboard side of the curve will tend to exhaust fluid from their controlled air springs while the control valves on the outboard side of the curve will tend to supply air to their controlled air springs. This condition would be satisfactory if it were not for the fact that when the vehicle suddenly ends the negotiation of the curve and again moves into a straight road condition, if it is a prompt change, the clearance height correction effected by the control valves during the long negotiation of the curve will have placed the body of the vehicle in a horizontal position relative to the ground but angular relative to the running gear for continuing negotiation of the curve but upon coming out of the curve suddenly, the delayed response of the control valves will be such that a time interval would elapse before the control valves would permit the angular position of the body of the car relative to the running gear to restore itself to a horizontal position after the centrifugal forces acting on the car body would be released as a result of moving out of the curve and reentering a straight line run. This condition would cause an unstable condition in the vehicle.

Hence, an additional control is provided to over-ride the fluid control valves whereby the fluid control valves for the fluid springs are retained in a neutral or inactive position to prevent any admission of fluid pressure or exhaust of fluid pressure from the air springs so long as there is a change in angular attitude between the vehicle chassis and the running gear, as occurs when the vehicle is negotiating a curve, or the effect of centrifugal force is effective on the vehicle. To accomplish this function, an electric solenoid 200 is secured to one end of each of the control valves 40, 41, 50 and 51, as more particularly illustrated on the control valve 40 of Figure 2. The electric solenoid 200 has an electric coil 201 within which there is positioned a movable core or armature 202 that is normally spring urged to the position illustrated in Fig. 2 by means of a compression spring 203. The forward end of the armature 202 has a notched recess 204 adapted to engage the end 205 of the valve actuator arm 70 so that when the electric coil 201 is energized, the armature 202 will move forwardly to lock the end 205 of the lever arm 70 in the recess 204 so that arm 70 will be mechanically held in a neutral or inactive position, and thereby prevent any operation of the fluid inlet valve 63 or the fluid exhaust valve 64.

The electric coil 201 is energized by a mercury switch 210 that is responsive to a change in angular attitude between the car body and the running gear of the vehicle. The switch 210 is disposed transversely of the car so that transverse roll is sensed by the switch when the car enters a curve. Also, the effect of centrifugal force on the body and on the mercury puddle 211 will cause it to move toward one end or the other of the mercury switch to close the contacts at one or the other end of the switch to energize the solenoid 200 and cause locking of the control valve 40 in its neutral position. Thus the mercury switch 210 is responsive to both factors of change in angular attitude of the car body relative to the running gear as well as the centrifugal force that acts upon the car body causing it to lean during a period of negotiation of a curve.

When the car moves out of the curve, the mercury puddle 211 will recenter itself as shown in Fig. 2 to de-energize the solenoid 200 and unlock the valve 40 to function in the normal manner heretofore described. The solenoid 200 receives its electrical energy from a battery 212.

A second mercury switch 215 similar to the mercury switch 210 can be placed electrically in parallel with the mercury switch 210 to also operate the mercury solenoid 200. This mercury switch is positioned longitudinally of the car so that the mercury puddle 216 is responsive to longitudinal angular change of attitude of the car body relative to the running gear, as occurs during a braking period which results in "dive" of the front end of the car or during a rapid acceleration period that results in "squat" of the rear end of the car. Thus the solenoid 200 will be energized to render the control valve 40 ineffective during a period of braking or a period of rapid acceleration to prevent prolonged change in attitude effecting a change in height correction which would not be desirable when the braking period or the acceleration period ended.

While the form of embodiment of the invention as herein disclosed constitutes a preferred form, it is to be understood that other forms might be adopted as may come within the scope of the claims which follow.

What is claimed is as follows.

1. Control apparatus for regulating supply and exhaust of fluid to and from an expansible fluid spring for a motor vehicle to maintain a regulated clearance height between the sprung mass and the unsprung mass of the vehicle, comprising, expansible fluid spring means supporting a sprung mass upon an unsprung mass, correcting control means actuated by a change in clearance height between the sprung mass and the unsprung mass to effect clearance height correction and having a neutral position in which it is ineffective for clearance height correction, and other control means actuated in response to a change in attitude of the sprung mass relative to the unsprung mass effective to retain said correcting control means in its neutral position during the period of said change in attitude.

2. Control apparatus for regulating supply and exhaust of fluid to and from an expansible fluid spring for a motor vehicle to maintain a regulated clearance height between the sprung mass and the unsprung mass of the vehicle, comprising, expansible fluid spring means supporting a sprung mass upon an unsprung mass, control means actuated by a change in clearance height between the sprung mass and the unsprung mass having one position providing for supply of fluid to the spring means and a second position to provide for exhaust of fluid from the spring means and a third neutral position, and other control means actuated in response to a change in attitude of the sprung mass relative to the unsprung mass to effect positioning of said first control means in its said neutral position during the period of said change in attitude.

3. Control apparatus for regulating supply and exhaust of fluid to and from an expansible fluid spring for a motor vehicle to maintain a regulated clearance height between the sprung mass and the unsprung mass of the vehicle, comprising, expansible fluid spring means supporting a sprung mass upon an unsprung mass, correcting control means actuated by a change in clearance height between the sprung mass and the unsprung mass to effect clearance height correction and having a neutral position in which it is ineffective for clearance height correction and including a movement impeding device normally retarding the response rate of the control means to effect a response rate of the control means less than the rate of movement of the unsprung mass relative to the sprung mass, and other control means actuated in response to a change in attitude to the sprung mass relative to the unsprung mass effective to retain said correcting control means in its neutral position and render thereby its movement impeding device ineffective during the period of said change in attitude.

4. Control apparatus for regulating supply and exhaust of fluid to and from an expansible fluid spring for a motor vehicle to maintain a regulated clearance height between the sprung mass and the unsprung mass of the vehicle, comprising, expansible fluid spring means supporting a sprung mass upon an unsprung mass, control means actuated by a change in clearance height between the sprung mass and the unsprung mass having one position providing for supply of fluid to the spring means and a second position to provide for exhaust of fluid from the spring means and a third neutral position, means to effect locking of said control means in its said neutral position, and means sensing a change in angular attitude of the sprung mass relative to the unsprung mass to render said locking means effective to lock said control means in its neutral position during the period of said change in attitude.

5. Control apparatus for regulating supply and exhaust of fluid to and from an expansible fluid spring for a motor vehicle to maintain a regulated clearance height between the sprung mass and the unsprung mass of the vehicle, comprising, expansible fluid spring means supporting a sprung mass upon an unsprung mass, control means actuated by a change in clearance height between the sprung mass and the unsprung mass having one position providing for supply of fluid to the spring means and a second position to provide for exhaust of fluid from the spring means and a third neutral position, means to effect locking of said control means in its said neutral position, and means sensing a change in angular attitude of the sprung mass relative to the unsprung mass to render said locking means effective to lock said control means in its neutral position during the period of said change in attitude, said sensing means being effective to sense transverse angular change in attitude as well as longitudinal change in attitude.

6. Control apparatus for regulating supply and exhaust of fluid to and from an expansible fluid spring for a motor vehicle to maintain a regulated clearance height between the sprung mass and the unsprung mass of the vehicle, comprising, expansible fluid spring means disposed between the chassis at each side thereof and the front and rear axles of a vehicle whereby to support the chassis on the axles, correcting control means actuated by a change in clearance height between the chassis and the axles to provide for inlet of fluid to the spring means upon a decrease in clearance height and exhaust of fluid from the spring means upon an increase in clearance height and having a neutral position in which fluid can have neither ingress nor egress of the spring means, and other control means actuated by a change in angular attitude of the chassis relative to the axles to retain said correcting control means in its neutral position and thereby prevent any change in fluid pressure in the spring means during the period of said change in attitude.

7. Control apparatus for regulating supply and exhaust of fluid to and from an expansible fluid spring for a motor vehicle to maintain a regulated clearance height between the sprung mass and the unsprung mass of the vehicle, comprising, expansible fluid spring means disposed between the chassis at each side thereof and the front and rear axles of a vehicle whereby to support the chassis on the axles, independent control means for the rear axle positioned spring means and the front axle positioned spring means each responsive to a change in clearance height between the chassis and the respective axles to effect clearance height correction, each of said control means having a neutral position in which it is ineffective to provide for clearance height correction, means effective for each of said control means to lock the said control means in its said neutral position, and an attitude responsive control effective to sense a change in angular attitude between the chassis and the axles to render said locking means effective to hold said control means in its said neutral position during the period of said change in attitude.

References Cited in the file of this patent
UNITED STATES PATENTS

| | | |
|---|---|---|
| 2,405,250 | Wolf | Aug. 6, 1946 |
| 2,687,311 | Nallinger | Aug. 24, 1954 |